(No Model.)
D. J. TAYLOR.
DRESS CHART.
No. 266,919. Patented Oct. 31, 1882.
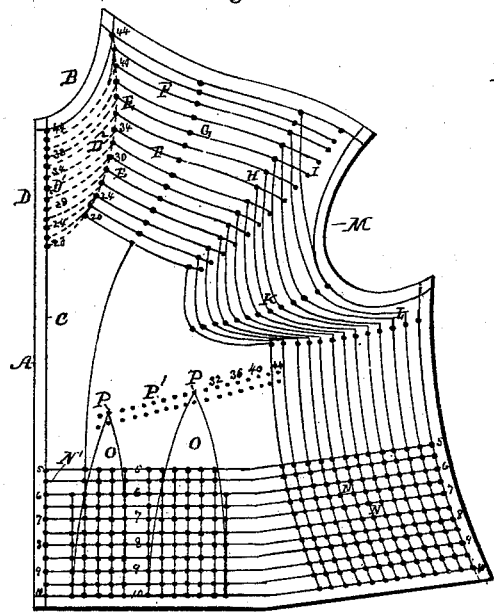
WITNESSES:
Thos. Houghton.
Solon C. Kemon
INVENTOR:
D. J. Taylor
BY
ATTORNEYS.

UNITED STATES PATENT OFFICE.

DAVID J. TAYLOR, OF GRINNELL, IOWA.

DRESS-CHART.

SPECIFICATION forming part of Letters Patent No. 266,919, dated October 31, 1882.

Application filed February 11, 1882. (No model.)

*To all whom it may concern:*

Be it known that I, DAVID JACKSON TAYLOR, of Grinnell, in the county of Poweshiek and State of Iowa, have invented a new and Improved Set of Dress-Charts; and I do hereby declare that the following is a full, clear, and exact description of the same, reference being had to the accompanying drawings, forming part of this specification, in which—

Figure 1 represents a chart by means of which the front of a dress is marked out. Fig. 2 represents the dart-rule. Fig. 3 represents a chart by means of which the back of a dress is marked out. Fig. 4 represents the sleeve-chart, and Fig. 5 represents the skirt-chart.

My invention relates to dress-charts; and it consists in the peculiar construction of a set of charts for facilitating the drafting, cutting, and fitting of ladies' and children's garments, as hereinafter more fully set forth.

In the accompanying drawings, Fig. 1 represents chart No. 1 of my set of dress-charts, by means of which the front of a lady's or child's dress is marked out upon the goods of which it is to be made.

A represents the straight edge of the front of chart No. 1, terminating at its upper end in the curved neck portion B.

C represents a vertical line extending from top to bottom of chart No. 1, and parallel to the straight vertical line A of the chart and a short distance therefrom, and provided near its upper end with spaced perforations D, arranged on a scale, D', as shown in Fig. 1.

E E represent a series of perforations arranged in a curved line near the top of Fig. 1 and to a scale, D², the same as the perforations D in the upper end of the perforated line C, and curved lines F are drawn joining the similarly-numbered perforations D and E.

G represents a series of perforations arranged to a scale for Gabrielle pattern for children, and vest and combination suits for ladies.

M represents the lower arm-hole, and H I K L represent curved perforated lines arranged in curved lines to a scale. The curved lines F, connecting the perforations D and E, are prolonged and extend parallel to each other through the perforations G H I K, and thence down through the perforations N to the lower edge of the chart. By this construction great simplicity is attained. By beginning on the front line on any given number and tracing the line around, dotting in each perforation on the goods, the garment is marked and can readily be cut out.

O represents the darts placed in position on chart No. 1, with their points resting on the perforations P, made in parallel straight lines on chart No. 1 and arranged to a scale, P'. The tops or points of each dart are changeable, so as to be moved forward or back, nearer together or farther apart, to suit the different sizes or forms or taste of the wearer, and are divided by the scale N' into inches and half-inches, (marked N.)

Q, Fig. 2, chart No. 2, represents the dart-rule, one side of which, Q', is straight and the other side, Q², curved to form the spring over the hip, also the points of the front and back darts, the edges of the scale being divided into inches and half-inches.

R, Fig. 3, chart No. 3, represents the back; S, the work-line; and T, the wedge-shaped margin, which is the spring on the back, beginning at the top and gradually widening to the bottom. The work-line S is provided with spaced perforations S' S², near its top and bottom, arranged to a scale, and perforated lines U parallel to the base-line are drawn through the perforation S².

V, W W, and X are perforated spaced lines, and Y is a perforated line, so drawn as to strike the center of the shoulder Z on all sizes of garments. The bottom of the back also is arranged to taper or to cut longer in the center of the back. Lines $a$ are drawn through the perforations S' in the work-line S parallel to each other through the perforations V, Y, W W, X, and U to the base-line of the chart, so that the size of the back of the garment may be marked on the goods through the perforations from the front around to the base-line and then cut out therefrom.

B, Fig. 4, represents the No. 1 chart of my set, shaped like a sleeve, with a series of perforations, $c$, arranged in its curved top $d$, and provided with a scale, $d'$, so that by placing the number representing the size of arm opposite the top dot always gives a perfect curve over the shoulder, and by reversing the chart and using the same number a perfect curve is given under the arm. This scale is lettered $e$.

$g$ represents a series of spaced perforations, made along one side of the No. 4 chart, and $h\ h$ are perforated lines. Lines $i\ i$ are drawn from the perforations $c$ to the divisions of the scale $e$ and produced until they meet the upper line, $h$. Parallel lines $k$ are then drawn and perforations are made where the lines $h\ k$ intersect each other, which are provided with a scale lettered $l$. Scales $l'\ l^2\ l^3\ l^4$ are formed at the upper and lower ends of the chart and perforated lines $l^5$.

$m$, Fig. 5, represents the No. 5 skirt-chart of my set, the curved side $n$ of which I employ to form the curved seam in the back, and which also serves as a shaper for the top and bottom of all kinds of dress-skirts, and is provided with scaled perforations $o$ and darts $p$ with perforations $p'$ on the lines of the sides of the trimmings.

To draft and cut the front of a body, I begin by taking four measures—viz., bust, waist, length of waist under arm, and for round-shouldered persons the length of back. The chart is then placed straight on the goods, allowing for hem in front, and the bust-measure dotted in on front-line and the line traced to length of waist, dotting in each perforation. For Gabrielle patterns make three dots. Then follow the dotted line to length of waist. Then dot in the front-line. Then begin at the shoulder, allowing for seams, and dot around to length of waist. Then dot in the dividing-line, then the points of the darts, then division between the darts. Then lay off the darts as wide or narrow as the taper may require. Then use the chart as a ruler to join the dots together, and use the dart-rule to mark out the darts; and when the under arm-dart is used, get the center between the back-dart and the under arm-line, and lay off the width of dart, extending it up to the center of the scye of the arm and mark it out with the straight side of the rule. Then measure eight inches straight down the goods from under arm-line and dot, then three inches to the right and dot. Then, by placing the curved side of rule at dot and marking down, a perfect spring will be obtained for a medium form. Then extend the front-line down a suitable length for a basque. Then, with the skirt-chart, shape the bottom to suit the taste. Then draft the lower part of the darts straight down. For cutting polonaise, princess dress, or wrapper we use the long-skirt chart.

To draft and cut the back, the back-chart is placed straight on the goods and the bust-measure is dotted in, and proceed in the same manner as for the front. For shoulder-seam back make three dots. Then trace the dotted line to length of waist. Then dot in front-line. Then use the chart as a ruler, joining the dots together. Then begin at shoulder, where you left off, and continue around the waist-line, omitting the dot in center of arm-scye. Then dot in the dividing-line and use chart to join the dots together. Then, with the dart-rule, the skirt may be added by drafting the front-line down ten inches and making it as wide as across the shoulders, then the side back in the same manner, making the bottom twice as wide as the waist-line. Always place the chart so as to bring the waist-line square on the goods.

To draft and cut the sleeve, take three measures—viz., first, measure the arm on front side, from point of shoulder to base of thumb; second, size of arm at arm-scye; and, lastly, size of cuff. Then lay the sleeve-chart on the folded goods and dot opposite the number indicating length of arm at top and bottom, and draw a line from dot to dot. Then follow the line indicating the length until you arrive opposite the number denoting the size of arm. For upper half dot one number larger, and for under half dot one number smaller. Then follow under the number representing size of cuff to the junction of length, and dot. Then take off one number for under half. Now draw the chart in, placing the number representing the length opposite the dot, and draft up to top dot. In the same manner draft under half. Then place the number representing the size of arm on top scale opposite top dot, and draft curve over the shoulder. Then reverse chart and use the same number for under part. For gathered elbows make under parts as much smaller than top, as desired, by taking from under part as many numbers as you add to the top half.

To draft and cut trimmings, first fold the goods as wide or narrow as you desire. Then place the chart square on the goods, and dot through the dotted lines in either style. Then cut from dot to dot.

For cutting over or under skirts, place the chart on the folded goods and dot the gores, and if darts are desired dot them off, as shown, before removing the chart.

If the side seam is not desired, dot the front and side body-gores both in one. Then place the straight edge of the chart at the dot and draft down, giving as much or little spring as desired.

What I claim as my invention is—

1. In a set of dress-charts, the chart No. 1, provided with the curved neck part B, lower arm-hole, M, lines of perforations D E G H I K L N, with parallel lines F passing through said perforations to the bottom of the chart, scales D' D² N', parallel lines of perforations P, scale P', and movable darts O, whereby dress-fronts of different sizes and the same pattern can readily be marked out on the material of which the dress is to be made, substantially as described, and for the purpose set forth.

2. In a set of dress-charts, the chart No. 3, provided with the inclined work-line S, having perforations S' S² at its ends provided with scales, wedge-shaped margin T, provided with a scale, parallel perforated lines U, perforated lines V W W X, perforated line Y, so drawn as to strike the center of the shoulder Z on all sizes of garments, and lines $a$, drawn through the perforations S', V, Y, W, and U to the inclined bottom line of the chart, substantially as described, and for the purpose set forth.

3. In a set of dress-charts, the sleeve-chart No. 4, provided with a curved top, $d$, having a series of perforations, $c$, perforated lines $g$, $h$, $k$, and $l^5$, and scales $e$, $l$, $l'$, $l^2$, $l^3$, and $l^4$, substantially as described, and for the purpose set forth.

4. In a set of dress-charts, the skirt-chart No. 5, provided with the curved side $n$, scaled perforated lines $o$, perforated darts $p$, and perforations $p'$ along the edges of the trimmings, substantially as described, and for the purpose set forth.

DAVID JACKSON TAYLOR.

Witnesses:
M. V. CLARK,
MARY H. AIKIN.